United States Patent

Thomson

[15] 3,700,187

[45] Oct. 24, 1972

[54] REWIND DEVICE FOR WEB HANDLING APPARATUS

[72] Inventor: Kenneth W. Thomson, Rochester, N.Y.

[73] Assignee: Eastman Kodak Company, Rochester, N.Y.

[22] Filed: June 29, 1971

[21] Appl. No.: 158,035

[52] U.S. Cl. ..............242/190, 200/61.13, 352/124
[51] Int. Cl. ......B65h 59/38, G03b 1/04, G11b 15/32
[58] Field of Search............242/57, 189, 190, 75.51; 226/11; 352/124, 173, 174; 200/61.13-61.18

[56] References Cited

UNITED STATES PATENTS

| | | | |
|---|---|---|---|
| 3,135,476 | 6/1964 | Gooch | 242/190 |
| 3,184,130 | 5/1965 | Brayer et al. | 226/11 |
| 3,185,401 | 5/1965 | Hardy | 242/190 |
| 3,240,550 | 3/1966 | Mitchell et al. | 352/124 |

*Primary Examiner*—Leonard D. Christian
*Attorney*—W. H. J. Kline et al.

[57] ABSTRACT

A device for effecting automatic rewind in a web handling apparatus of the type having means for rotatably supporting a hub having a web of strip material wound thereon with the innermost end of the web anchored to the hub so that at least a portion of the web extends substantially radially from the hub when the web has been completely unwound therefrom includes drive means having a first condition for unwinding the web from the hub and a second condition for rotating the hub to rewind the web thereabout. A first sensing means is actuatable by an increase in tension of the web to move a switch contact from an inactive position to an active position, and a second sensing means is actuatable by a portion of the web extending radially from the hub to move a second switch contact from an inactive position to an active position whereat it engages the first switch contact of the first contact in its active position. The drive means is placed in its second condition to rewind the web onto the hub when the first and second switch contacts are engaged.

6 Claims, 2 Drawing Figures

PATENTED OCT 24 1972

3,700,187

KENNETH W. THOMSON
INVENTOR.

BY Milton S. Sales

W. H. J. Kline
ATTORNEYS

REWIND DEVICE FOR WEB HANDLING APPARATUS

CROSS-REFERENCE TO RELATED APPLICATION

Reference is made to commonly assigned copending U.S. Pat. application Ser. No. 158,001 entitled AUTOMATIC REWIND DEVICE FOR WEB HANDLING APPARATUS, filed concurrently herewith June 29, 1971 in the name William L. Burnham.

BACKGROUND OF THE INVENTION

1. Field of the Invention

The present invention relates generally to rewinding apparatus, and more specifically to an automatic rewind mechanism for web handling apparatus.

2. Description of the Prior Art

In web handling apparatus such as motion picture projectors or the like, a web is normally transported from a supply reel, through an operating station such as an aperture film gate, and onto a take-up reel. In a motion picture projector, the apertured film gate is positioned along the optical axis of the projector, and a film pull-down claw mechanism is incorporated in the projector for intermittently advancing the film past the aperture one frame at a time for projection. After the entire length of film has been projected and wound on the take-up reel, the operator normally manually connects the trailing end of the film to the supply reel, moves a lever to disconnect the drive system from the take-up reel and connected to the supply reel, and operates the projector to rewind the projected film from the take-up reel onto the supply reel.

Apparatus is known which eliminates the manual rewinding operations involved in such prior art motion picture projectors. In such apparatus, a web is transported therethrough in one direction for a specified operation, and after the operation has been completed, the web is automatically reversed in direction and rewound onto the supply reel. One such apparatus for automatically rewinding a motion picture film is disclosed in coassigned U.S. Pat. No. 3,300,155, issued Jan. 24, 1967 in the name of Robert J. Roman. In that apparatus, the trailing end of the film is anchored to the hub of the supply reel so that upon completion of the projection cycle, the portion of the film extending between the supply reel and the pull-down mechanism is tensioned. A device is provided for sensing the increase in the tension of such portion of the film and for shifting the projector mechanism to its rewind mode in response to such increase in tension. Mechanisms similar to the type disclosed in the Roman patent wherein the automatic rewind mechanism is engaged in response to an increase in web tension have proven to be highly reliable in commercial applications. However, such devices are subject to premature actuation of the rewind cycle should the tension in the reach of film between the supply reel and the pull-down mechanism momentarily increase beyond a critical value for any of a number of reasons such as for example either high inertial forces on the supply reel or reel "pick" (when the reel flanges momentarily catch the film to prevent smooth unwinding thereof). Therefore, it is desirable to provide means for differentiating between real and false end-of-film signals.

Another type of device for detecting the end of a film to effect automatic rewind is shown in U.S. Pat. No. 3,460,889 which issued on Aug. 12, 1969 in the name of Theo Wilharm. In that device, the trailing end of the film is also attached to the hub of a supply reel so that when the end of the film has been reached, the trailing portion of the film will be moved from a position tangent to the hub to a position extending radially from the hub. When this occurs, the film engages a sensing lever to trigger the rewind mechanism. The sensing lever is positioned on the projector so that it is normally disengaged from the film when at least a portion of the film is convoluted on the hub and is engaged by the film when the film extends radially from the hub. While the mechanism shown in the Wilharm patent appears to be suitable for its intended purpose, it is possible that a false rewind signal may be generated should the film unwinding from the reel catch on the reel flanges and be moved thereby to a position engaging the sensing lever.

A web handling apparatus including a device for effecting automatic rewind in response to the simultaneous tensioning of the web and movement of the web being unwound from the hub to a position extending radially from the hub is disclosed in commonly assigned copending U.S. Patent application Ser. No. 158,001, entitled AUTOMATIC REWIND DEVICE FOR WEB HANDLING APPARATUS, filed concurrently herewith in the name of William L. Burnham. In that device, a pair of switches, each being responsive to a respective one of the above-mentioned conditions, must close simultaneously to shift the projector to its rewind mode.

SUMMARY OF THE INVENTION

It is an object of the present invention to provide a web handling apparatus having a device for effecting automatic rewind in response to the simultaneous occurrence of two different physically detectable conditions indicative of the fact that the end of the film has been reached with an improved and less complex mechanism for sensing the occurrence of such conditions.

In accordance with the above object, I have provided a device for effecting automatic rewind wherein a first sensing means is actuatable by an increase in the tension of a web being unwound from a hub to move a switch contact from an inactive position to an active position, and a second sensing means actuatable by the trailing end portion of the web moving to a position extending radially from the hub to move a second switch contact from an inactive position to an active position whereat it engages the first switch contact if the first contact is in its active position. Closure of the switch contacts upon each other energizes a mechanism for placing the apparatus in a rewind condition.

The invention, and its objects and advantages will become more apparent in the detailed description of the preferred embodiment presented below.

BRIEF DESCRIPTION OF THE DRAWING

In the detailed description of the preferred embodiments of the invention presented below, reference is made to the accompanying drawing, in which.

DESCRIPTION OF THE PREFERRED EMBODIMENT

Figure 1:
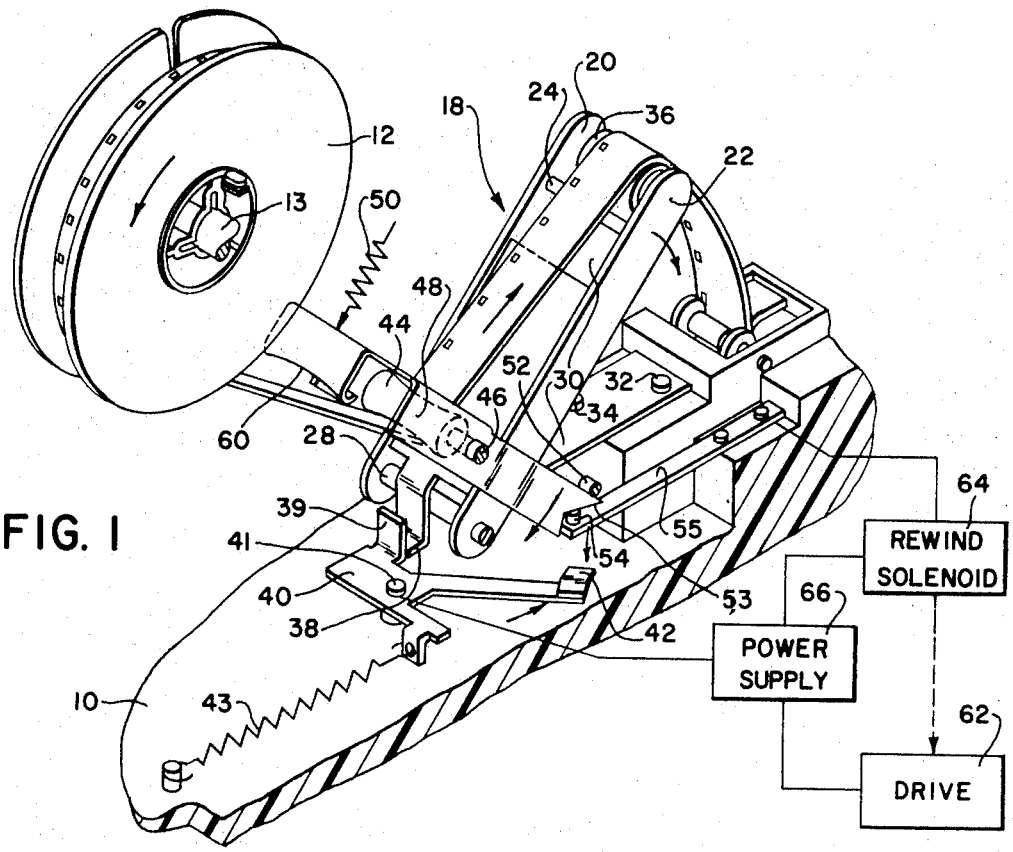
FIG. 1 is a perspective view of a portion of a motion picture projector incorporating the features of the present invention.

The embodiment of the present invention which is described herein incorporates the invention in a motion picture projection apparatus. However, it will be understood by those skilled in the art that the invention is equally suitable for use in other types of apparatus for advancing web material from a supply roll wherein it is desired to provide for automatically rewinding the web onto the supply roll. Because motion picture projectors are well known, the present description will be directed in particular to elements forming part of, or cooperating more directly with, apparatus in accordance with the present invention. It is to be understood that projector elements not specifically shown or described may take various forms well known to those skilled in the art.

Referring to the drawings, I have shown a portion of a motion picture projector including a portion of a housing 10 upon which a supply reel 12 may be rotatably supported on a spindle 13. The supply reel contains a roll of perforated motion picture film, the trailing end of which extends through a slot in the hub of the reel and is anchored to the hub by a pin, not shown. An example of such a reel is disclosed in coassigned U.S. Pat. No. 3,506,212 which issued Apr. 14, 1970 in the name of James J. Wenskus.

Figure 2:
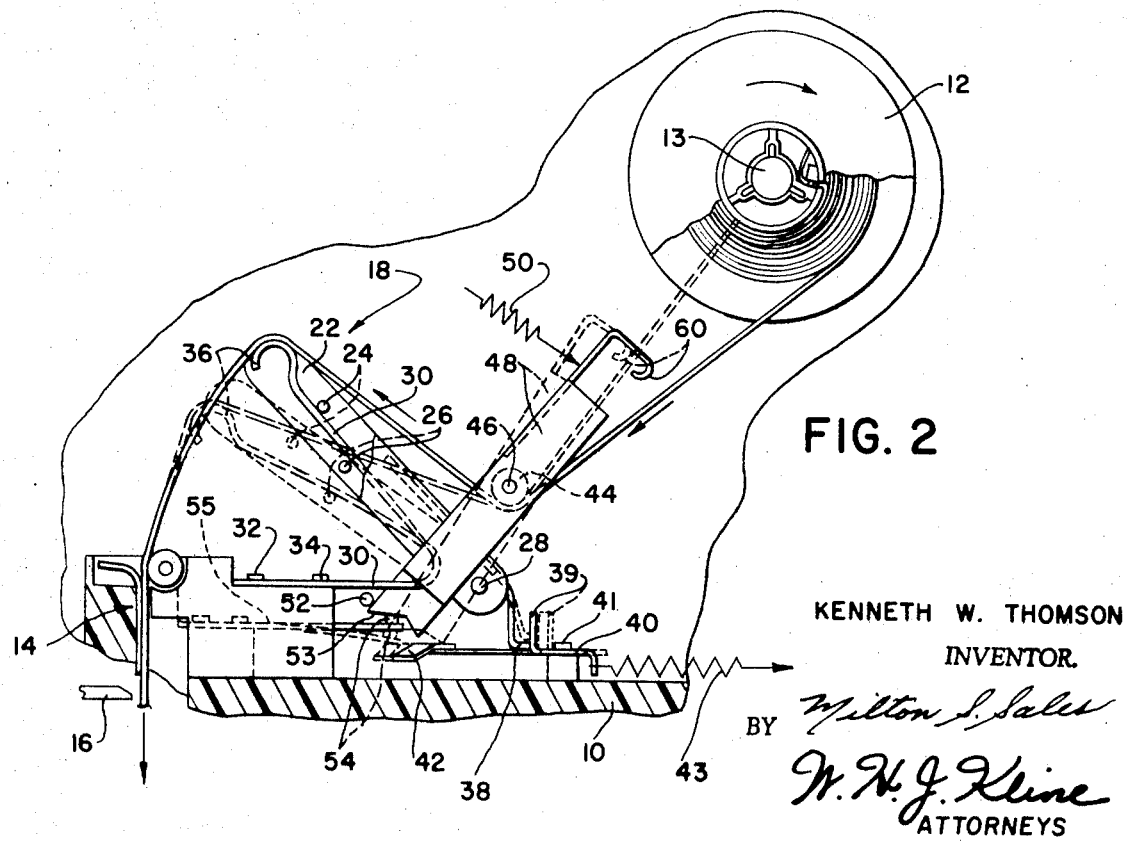
FIG. 2 is an elevational view partially in section showing the portion of the projector shown in FIG. 1.

The projector has an operating station or film gate 14 through which the film may be threaded. At the film gate, the film is intermittently advanced in a known manner by a pull-down mechanism of which a pull-down claw member 16 is shown in FIG. 2.

A film snubbing member 18 for isolating forces placed on the film at reel 12 from the film at gate 14 includes a pair of parallel arms 20 and 22 which are joined together by a pair of pins 24 and 26 and which are pivotally mounted on the projector housing by a stud 28. A leaf spring 30 is mounted on the projector housing by a pair of studs 32 and 34 and passes between pins 24 and 26. One end of leaf spring 30 is curved at 36 to form a guide surface for the film. In its unstressed condition, leaf spring 30 holds snubber 18 in the position shown in full lines in FIG. 2. A bent portion forms a tab 38 at the lower end of snubber 18.

Tab 38 is abutted by another tab 39 on a conductive armature 40 rotatably mounted on housing 10 by a pin 41. Armature 41 supports a switch contact 42 and is rotatably urged in a clockwise direction as viewed in FIG. 1 by a tension spring 43.

A roller 44 is rotatably mounted on housing 10 by a stud 46 for guiding the film along a predetermined path between supply reel 12 and bent portion 36 of leaf spring 30. Also rotatably mounted on stud 46 is a lever 48 which is urged in a clockwise direction as viewed in FIG. 2 by a spring 50 against a stop 52 so as to normally assume the full line position shown in FIG. 2. The top of lever 48 is curved at 60 to form a smooth surface for engaging the reach of film between supply reel 12 and roller 44. Curved portion 60 is preferably held out of contact with the film reach as long as the film is convoluted about the hub of the supply reel to avoid scratching the film. The bottom portion of lever 48 defines a surface 53 which engages an insulating pad 54 on a switch blade 55 for depressing the blade when lever 48 is moved to its phantom line position when the film extends radially from the hub of reel 12 when the last film convolution has been unwound from the hub.

I have schematically shown at 62 drive means which may be selectively coupled to either the take-up reel, not shown, or to supply reel 12 for rotating the reel coupled thereto in a direction to wind film thereon. Such a drive means is described in aforementioned U.S. Pat. No. 3,300,155. The drive means is normally coupled to the take-up reel and is disengaged therefrom and coupled to the supply reel when a rewind solenoid 64 is energized by a power supply 66 when switch contact 42 is engaged by blade 55.

OPERATION

To project a roll of film, a supply reel such as shown at 12 is mounted on spindle 13 and the leading end of the film is threaded under roller 44, around bent portion 36 of lead spring 30 and into gate 14. The film is intermittently advanced through the gate by pull-down claw 16 and is preferably wound onto a take-up reel, not shown. While the film is being projected, the pull-down claw will unwind film from the supply reel. Because of the inertial forces on the supply reel, the tension of the reach of film between that reel and the gate will momentarily increase with each pull-down stroke. To isolate this tension from the film in the gate, leaf spring 30 will be flexed by film tension to rotate film snubber 18 in a counterclockwise direction about stud 28 as the film is advanced through the gate. Between advancing strokes, leaf spring 30 will return the film snubber toward its full line position shown in FIG. 2. Should the inertial forces on the supply reel be abnormally high, the film tension will be sufficient to rotate snubber 18 to its phantom line position shown in FIG. 2, thereby rotating armature 40 about stud 41 until contact 42 is below blade 55. However, since switch blade 55 is not depressed at that time, rewind solenoid 64 will not be energized and the projector will not be placed in its rewind mode.

Referring to FIG. 2, bent portion 60 of lever 48 is positioned by spring 50 and stop 52 so that the reach of film between supply reel 12 and roller 44 does not contact the bent portion as long as the film is convoluted about the hub of the reel. As the last convolution of film is unwound from the reel, it will be pulled to a position extending radially from the reel hub. In this condition, the reach of film last referred to will be moved against bent portion 60 to rotate lever 48 in a counterclockwise direction as viewed in FIG. 2 to the phantom line position in which switch blade 55 is depressed by surface 53. Simultaneously, pull-down claw 16 tensions the film between the supply reel and the gate so that film snubber 18 is moved to its phantom line position shown in FIG. 2. Tab 38 will move armature 40 to position contact 42 below blade 55 to connect power supply 66 to rewind solenoid 64 to disengage drive means 62 from the take-up reel and to couple the drive means to the supply reel, thereby initiating the rewind mode of the projector. At this time, pull-down claw 16 is disabled by suitable means well known to those skilled in the art and film gate 14 may be opened to relieve the pressure on the film.

It may be seen that by the mechanism shown, the rewind operation of the projector will be initiated only when switch blade 55 is closed on contact 42. Since switch contact 42 is aligned with blade 55 by an increase in film tension between the supply reel and the gate and since switch blade 55 is depressed when the reach of film between the supply reel and roller 44 assumes a radial position with respect to the supply reel, a momentary increase with the film tension which could be caused by high inertial forces on the supply reel will not initiate film rewind as long as there is a convolution of film wrapped about the hub of reel 12. Similarly, should the film catch on the reel flanges as it is being unwound and thereby be moved to a position to engage bent portion 60 of lever 48 and to rotate the lever counterclockwise (or should lever 48 be accidentally rotated during film threading), the projector will not go into rewind because switch contact 42 has not been aligned with blade 55 by an increase in the film tension signifying the end of the film roll.

The invention has been described in detail with particular reference to preferred embodiments thereof, but it will be understood that variations and modifications can be effected within the spirit and scope of the invention.

I claim:

1. A device for effecting automatic rewind in a web handling apparatus of the type having (1) a housing, (2) means on said housing for rotatably supporting a hub having a surface upon which a web of strip material may be wound, and (3) drive means having a first condition for unwinding the web from the hub and a second condition for rotating the hub to rewind the web thereabout, said device comprising:
    a switch blade mounted on said housing for movement along a path from a first position to a second position;
    means for sensing a first physically detectable condition indicative of the fact that the web has been completely unwound from the hub and for moving said switch blade along said path from its first position toward its second position in response to such condition;
    a switch contact mounted on said housing for movement between a first position spaced from said path to a second position in said path;
    means for sensing a second, different physically detectable condition indicative of the fact that the web has been completely unwound from the hub and for moving said switch contact to its second position in response to such condition; and
    means operatively connected to said drive means for placing said drive means in its second condition upon engagement of said switch contact by said switch blade.

2. A device for effecting automatic rewind in a web handling apparatus of the type having (1) a housing, (2) means on said housing for rotatably supporting a hub having a surface upon which a web of strip material may be wound with the innermost end of the web anchored to the hub so that at least a portion of the web extends substantially radially from the hub when the web has been completely unwound therefrom, and (3) drive means having a first condition for unwinding the web from the hub and a second condition for rotating the hub to rewind the web thereabout, said device comprising:
    a switch blade mounted on said housing for movement along a path from a first position to a second position;
    means actuatable by said portion of the web extending radially from the hub for moving said switch blade from its first position toward its second position;
    a switch contact mounted on said housing for movement between a first position spaced from said path to a second position in said path;
    means for moving said switch contact from its first position to its second position in response to an increase in the tension of the web; and
    means operatively connected to said drive means for placing said drive means in its second condition upon engagement of said switch contact by said switch blade.

3. A device as defined in claim 2 wherein said means for moving said switch blade comprises:
    means for guiding that portion of the web which is being unwound from said hub, said guide means being spaced from said hub supporting means;
    a lever having a portion disposed between said guide means and said hub supporting means in such position that said lever portion (1) is bypassed by said web portion when it extends tangentially from said hub and (2) is engaged by said web portion when such portion extends radially from said core.

4. A device as defined in claim 3 wherein said lever is mounted on said housing for movement between a first position whereat said lever portion would interfere with said web portion extending radially from said hub toward said guide means and a second position whereat said lever portion is out of the path of said web portion when said web portion extends radially from said hub, and further comprising spring means for urging said lever toward its first position.

5. A device for effecting automatic rewind in a web handling apparatus of the type having (1) a housing, (2) means on said housing for rotatably supporting a hub upon which a web having opposed surfaces may be wound with the innermost end of the web anchored to the hub so that at least a portion of the web extends substantially radially from the hub when the web has been completely unwound therefrom, (3) means on said housing for defining a guide path for the web unwound from the hub, (4) means for advancing the web along said guide path from the hub and (5) means actuatable for rotating the hub to rewind the web thereabout, said device comprising:
    a switch blade mounted on said housing for movement along a path from a first position to a second position;
    first sensing means engageable by one surface of the web and actuatable by said portion of the web extending radially from the hub for moving said switch blade along said path from its first position toward its second position;
    a switch contact mounted on said housing for movement between a first position spaced from said path to a second position in said path;
    second sensing means engageable by the other surface of the web and actuatable by an increase in the tension of the web between the hub and said web advancing means above a predetermined value for moving said switch contact to its second position; and means for actuating said rewind means upon engagement of said switch contact by said switch blade.

6. A device as defined in claim 5 wherein said first sensing means comprises:

means for guiding that portion of the web which is being unwound from said hub, said guide means being spaced from said hub supporting means; and a lever having a portion disposed between said guide means and said hub supporting means in such position that said lever portion (1) is bypassed by said web portion when it extends tangentially from said hub and (2) is engaged by said web portion when such portion extends radially from said hub.

* * * * *